Figure 1:
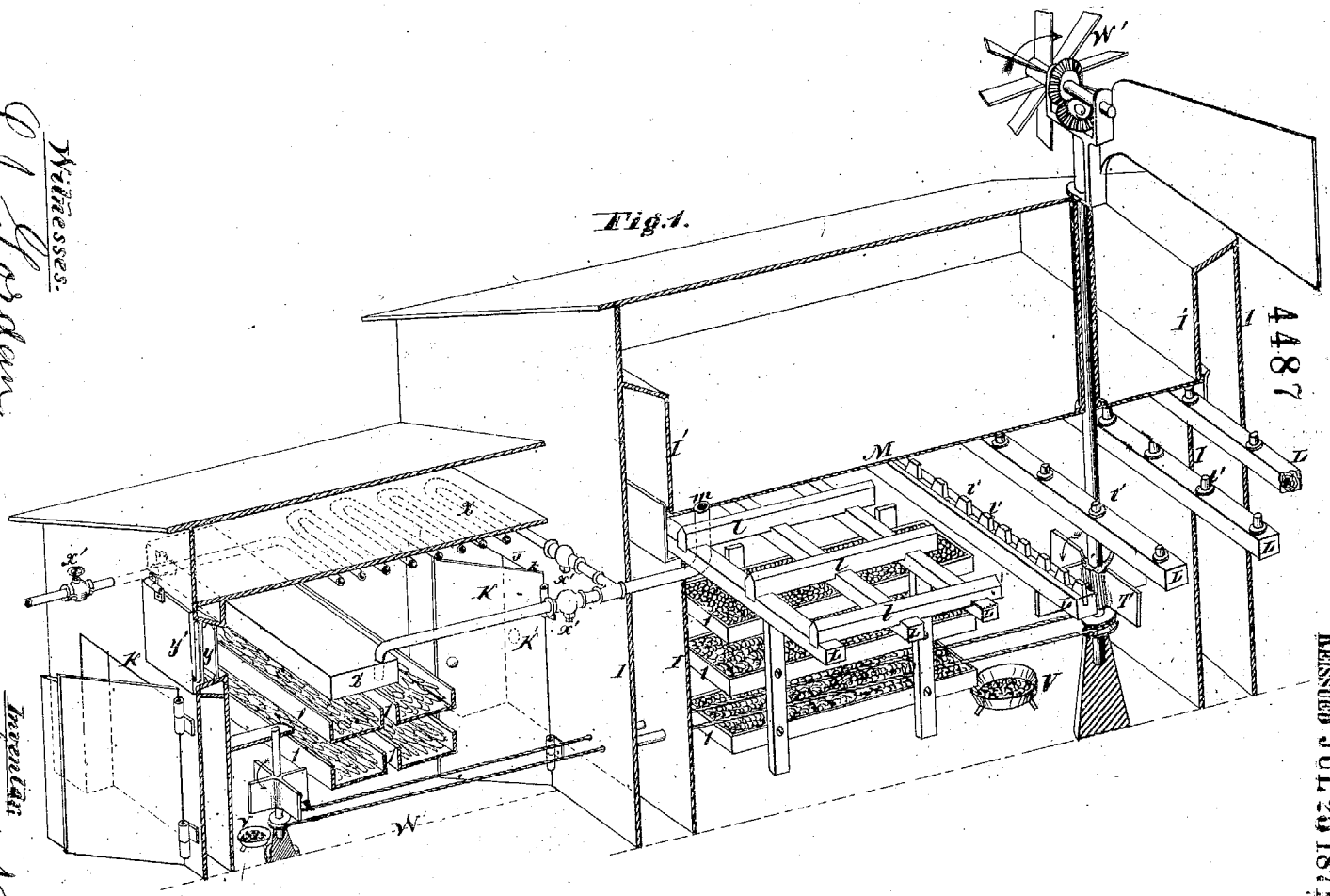

B. M. Nyce, Buildings for Preserving Meats &c.

Sheet No. 1. 2 Sheets.

REISSUED JUL 25 1871

4487

Witnesses.

S. J. Gordan.

P. J. Baldwin.

Inventor

Benjamin Markley Nyce.

Sheet No. 2.
B. M. Nyce, Buildings for Preserving Meats &c 2 Sheets
4487
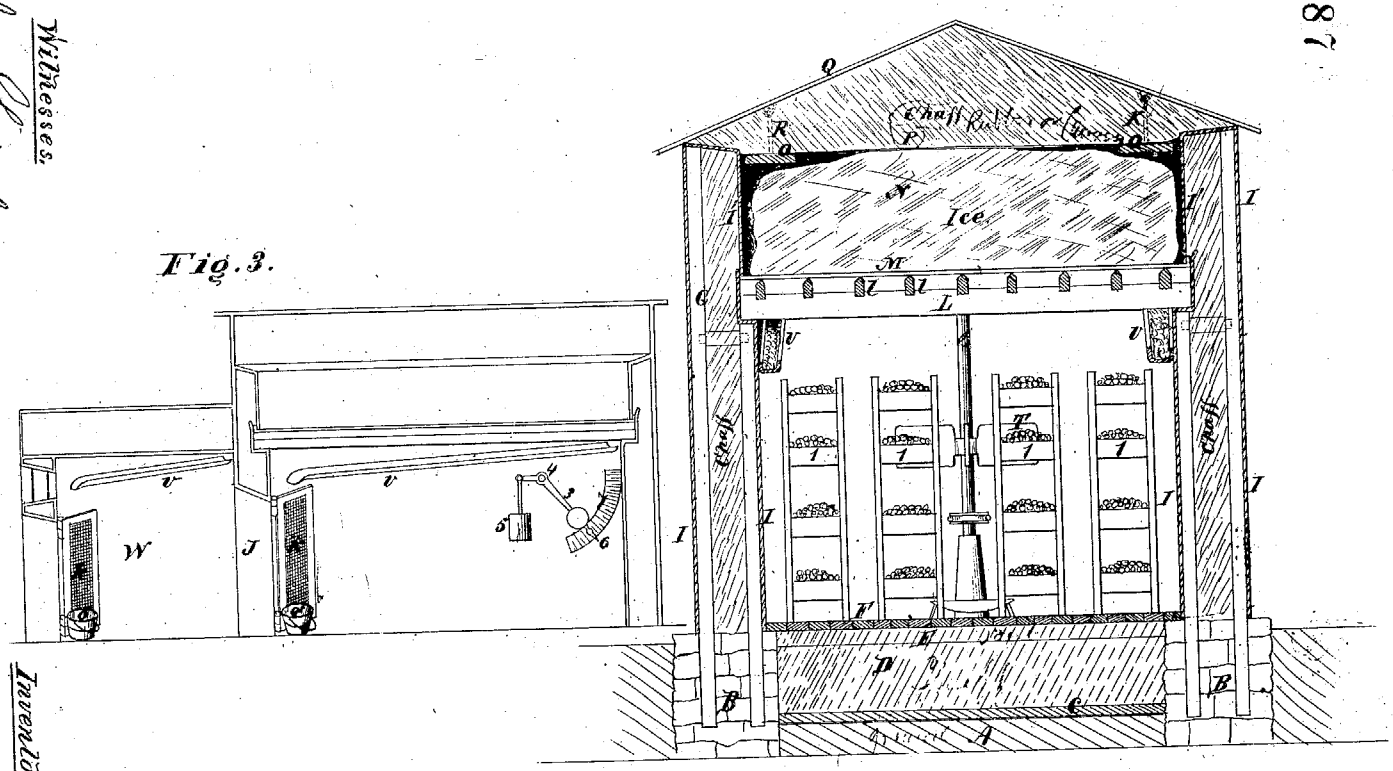
Witnesses.
S. J. Gordan
F. J. Baldwin.
Inventor.
Benjamin Markly Nyce

UNITED STATES PATENT OFFICE.

BENJAMIN MARKLEY NYCE, OF CLEVELAND, OHIO.

IMPROVEMENT IN BUILDINGS FOR PRESERVING FRUITS AND OTHER SUBSTANCES.

Specification forming part of Letters Patent No. 31,734, dated March 19, 1861; reissue No. 3,252, dated January 5, 1869; reissue No. 4,487, dated July 25, 1871.

*To all whom it may concern:*

Be it known that I, BENJAMIN MARKLEY NYCE, of Cleveland, Cuyahoga county and State of Ohio, have invented certain new and useful Improvements in Houses for Preserving Fruits, Meats, and other perishable substances, and peculiarly adapted to the successful brewing and keeping of lager-beer; and do hereby declare that the following is a full, clear, and exact description thereof, reference being had to the accompanying drawing making a part of this specification, in which—

Figure 1 is a perspective vertical section of the house containing my improvements. Fig. 2 is a transverse section of the same. Fig. 3 is a longitudinal section thereof.

Similar letters of reference indicate corresponding parts in each figure.

The construction and operation are as follows: The ground surface A inclosed by the walls B should be coated with some durable and impervious substance, C, like pitch or cement, to exclude moisture. Upon this coating should be spread some three or four feet of chaff, D, upon which lay joists E to support a vapor-proof floor, F, of wood, metal, or cement, to exclude odor or moisture. The inclosing walls should be as air and heat-tight as practicable, and may be made as follows: G and G′ are outer and inner frame-works of scantling sheathed with sheet-metal I I′, the joints secured by solder, overlapping, and nailing, or otherwise; or they may be made of brick or stone or any other suitable material, though I consider the method first described preferable to all others. The spaces between the walls may be packed with chaff, sawdust, tan-bark, or other non-conductor. The doors K K should also be made double, and packed in the same manner. Rooms of large size intended for the preservation of delicate articles should be subdivided by sheet-metal partitions. M is a metallic floor for supporting the ice. Galvanized sheet-iron is, I think, the best material. It should be made tight by riveting and soldering, so as to prevent the passage of air and moisture, and slightly sloping toward the ventages *m* to carry off the water from the melting ice. L L are joists for supporting the metallic floor. They should be made wholly, or at least at their upper edges, of metal; and these edges should be as small as practicable, so as to afford sufficient support to the floor and at the same time secure the greatest and most equal exposure of the under surface of the floor, thus obtaining a more uniform melting of the ice and greater degree of cold. Or, instead of edges of metal, we may use knobs or blocks of metal, taking care in every case to secure a sufficient support for the floor, according to the size of the house or chamber and the quantity of ice to be stored in it. P is a flexible diaphragm or covering for the ice, made of tarpaulin, India rubber, or other flexible and impervious material, and supported at its outer edges by a wooden frame, so as to prevent the sinking of the diaphragm between the body of the melting ice and the sides of the reservoir. The space between the cover and the roof is packed with chaff or other light non-conductor. R R are cords depending from the roof, by which the diaphragm and its inclosing frame may be suspended at any desired height and in a horizontal position, being let down from time to time as the ice melts. T is an atmospheric agitator, driven by the windmill W′, to secure the equable dryness and temperature of the air. U U are shallow troughs, slightly inclined, to contain chloride of calcium to absorb the moisture. The chloride, as it deliquesces, gradually descends and is caught in vessels at the lower end of the troughs, from which it is taken and dried over a fire, and returned to the upper end of the troughs to go through the same process. V V are pans for charcoal or other antiseptic substance. 7 7 are shelves for supporting fruit, &c. W is a vestibule or anteroom leading to the main chamber, and having in its upper part a coil, X, and tank *x* to receive the meltings from the ice. Its temperature may be regulated by opening and closing the faucet *x′*. Y is a double window, closed by a thick non-conducting shutter, Y′.

This vestibule is useful for a variety of purposes. It prevents immediate communication between the inner and outer air. Being from seven to ten degrees warmer than the main chamber, it may be used to contain articles requiring less cold or to ripen fruit. It may be provided with apparatus for agitating, purifying, and drying the air, as in the main chamber, and may, if necessary, be divided into compartments in the same manner.

To determine the exact hygrometric condition of the air in the preserving-chamber I employ a bent beam, 3, poised on the fulcrum 4, and having at one end a cup, 5, containing a solution of chloride of calcium, and at its other end a pointer, 6, which, as the cup rises and falls, indicates in scale 7 the slightest change of moisture.

It is obvious that there are purposes to which these improvements are applicable that do not require so great a degree of cold and dryness as is necessary for preserving fruit. For example, to preserve lager-beer a temperature of 46° will answer, 43° being the best temperature to insure the slow and even chemical changes necessary during its two weeks of fermentation—a necessity which has heretofore closed almost all the breweries in the world from June to September. For all such purposes the strict conditions herein stated may be modified according as greater or lesser cold and dryness are desired. If moisture is not detrimental, leave out the absorbents. If a uniform temperature of 40° will not suffice, the walls and foundation may be less perfect and the instructions for insulating the metallic floor less rigidly adhered to. The floor ought still, in all cases, in my judgment, to be tight; but this is not indispensable. The leakage may be carried off by troughs or other means, and the ordinary dampness, which would be fatal to fruit, is, in other cases, less prejudicial.

The inventions herein described are improvements on those described in my former patent of November 2, 1858, and the reissues of the same.

What I now claim as my invention, and desire to secure by Letters Patent, is—

1. A metallic floor, supported by blocks or narrow edges of metal in an insulated house, with ice above and a preserving-chamber below, substantially as described.

2. The use of a vestibule or anteroom, in combination with an insulated house, substantially as described.

3. The metallic floor, as in the first claim, in combination with absorbents, applied and operating substantially as described.

BENJAMIN M. NYCE.

Witnesses:
JOHN H. BURRIDGE.
D. L. HUMPHREY.